US011014993B2

(12) United States Patent
Fox

(10) Patent No.: US 11,014,993 B2
(45) Date of Patent: May 25, 2021

(54) THERMALLY STABLE, DISPERSIBLE CELLULOSE NANOCRYSTALS

(71) Applicant: Douglas Fox, Reston, VA (US)

(72) Inventor: Douglas Fox, Reston, VA (US)

(73) Assignee: AMERICAN UNIVERSITY, Washington, DC (US)

( * ) Notice: Subject to any disclaimer, the term of this patent is extended or adjusted under 35 U.S.C. 154(b) by 158 days.

(21) Appl. No.: 15/229,738

(22) Filed: Aug. 5, 2016

(65) Prior Publication Data

US 2017/0037155 A1 Feb. 9, 2017

Related U.S. Application Data

(60) Provisional application No. 62/201,873, filed on Aug. 6, 2015.

(51) Int. Cl.

| | |
|---|---|
| ***C08B 15/04*** | (2006.01) |
| ***B01J 39/04*** | (2017.01) |
| ***C08L 1/04*** | (2006.01) |
| ***C09D 101/04*** | (2006.01) |
| ***B05D 1/30*** | (2006.01) |

(52) U.S. Cl.

CPC ............... *C08B 15/04* (2013.01); *B01J 39/04* (2013.01); *B05D 1/30* (2013.01); *C08L 1/04* (2013.01); *C09D 101/04* (2013.01)

(58) Field of Classification Search

CPC ............ C08B 15/00; C08B 15/08; C02F 1/42
USPC ........................................................ 536/124
See application file for complete search history.

(56) References Cited

U.S. PATENT DOCUMENTS

| | | | | |
|---|---|---|---|---|
| 8,652,636 B2 | 2/2014 | Beck et al. | | |
| 8,901,290 B2 | 12/2014 | Beck et al. | | |
| 2010/0279019 A1* | 11/2010 | Beck | B82Y 20/00 | 427/384 |
| 2011/0183141 A1* | 7/2011 | Beck | C08B 15/08 | 428/402 |

OTHER PUBLICATIONS

Eyley et al ("Imidazolium grafted cellulose nanocrystals for ion exchange applications", Chem. Commun, 2011, 47, 4177-4179) (Year: 2011).*

Araki, J.; Wada, M.; Kuga, S.; Okano, T., Influence of surface charge on viscosity behavior of cellulose microcrystal suspension. *J Wood Sci* 1999, 45, 258-261.

Azouz, K.B.; Ramires, E.C.; Van den Fonteyne, W.; El Kissi, N.; Dufresne, A., Simple Method for the Melt Extrusion of a Cellulose Nanocrystal Reinforced Hydrophobic Polymer. *ACS Macro Letters* 2012, 1, 236-240.

Beck, S.; Bouchard, J.; Berry, R., Dispersibility in water of dried nanocrystalline cellulose. *Biomacromolecules* 2012, 13, 1486-1494.

Bledzki, A. K.; Reihmane, Gassan, S. J., Thermoplastics Reinforced with Wood Fillers: A Literature Review. Polym—Plastics Technol Eng 1998, 37, 451-468.

Cheung, C. C. Y.; Giese, M.; Kelly, J. A.; Hamad, W. Y.; MacLachlan, M. J., Iridescent Chiral Nematic Cellulose Nanocrystal/Polymer Composites Assembled in Organic Solvents. *ACS Macro Letters* 2013, 2, 1016-1020.

Davis, R. D.; Gilman, J. W.; Sutto, T. W.; Callahan, J. H.; Trulove, P. C.; De Long, H., Improved thermal stability of organically modified layered silicates. *Clays and Clay Minerals* 2004, 52, 171-179.

Dufresne, A., *Nanocellulose: From Nature to High Performance Tailored Materials*, Walter de Gruyter: Berlin, 2012.

Espert, A.; Vilaplana, F.; Karlsson S., Comparison of water absorption in natural cellulosic fibres from wood and one-year crops in polypropylene composites and its influence on their mechanical properties. *Composites A* 2004, 35, 1267-1276.

Espinosa, S. C.; Kuhnt, T.; Foster, E. J.; Weder, C., Isolation of Thermally Stable Cellulose Nanocrystals by Phosphoric Acid Hydrolysis. *Biomacromolecules* 2013, 14, 1223-1230.

Gao, F., Clay/polymer composites: the story. *Materials Today* 2004 11, 50-55.

Huang, J.; Chang, P. R.; Lin, N.; Dufresne, A., eds., *Polysaccharide Based Nanocrystals: Chemistry and Applications*, Wiley-VCH, 2015.

Hubbe, M.A.; Rojas, O.J.; Lucia, L.A.; Sain, M., Cellulose Nanocomposites: A Review. *BioResources* 2008, 3, 929-980.

Inamuddin, Dr.; Luqman, M. (eds.), *Ion Exchange Technology II: Applications*. Springer: Dordrecht, Netherlands, 2012.

Li, W.; Yue, J.; Liu, S., Preparation of nanocrystalline cellulose via ultrasound and its reinforcement capability for poly(vinyl alcohol) composites. *Ultrasonics Sonochemistry* 2012, 19, 479-485.

Mariano, M.; El Kissi, N.; Dufresne, A., Cellulose nanocrystals and related nanocomposites: Review of some properties and challenges. *J Polym Sci. B: Polym Phys* 2014, 52, 791-806.

Miao, C. W.; Hamad, W. Y., Cellulose reinforced polymer composites and nanocomposites: a critical review. *Cellulose* 2013, 20, 2221-2262.

Montanari, S.; Roumani , M.; Heux , L.; Vignon, M.R., Topochemistry of Carboxylated Cellulose Nanocrystals Resulting from TEMPO-Mediated Oxidation. *Macromolecules* 2005, 38, 1665-1671.

Peng, B. L.; Dhar, N.; Liu, H. L.; Tam, K. C., Chemistry and Applications of Nanocrystalline Cellulose and its Derivitives: A Nanotechnology Perspective. *Canadian Journal of Chemical Engineering* 2011, 89, 1191-1206.

(Continued)

*Primary Examiner* — Shaojia A Jiang
*Assistant Examiner* — Everett White
(74) *Attorney, Agent, or Firm* — Thompson Hine LLP

(57) ABSTRACT

The present application relates to cellulose nanocrystals and other anionic carbohydrates and methods of preparation thereof. Specifically, in certain embodiments, the cellulose nanocrystals are modified using ion exchange technology to yield thermally stable or task-specific, dispersible cellulose nanocrystals.

3 Claims, 5 Drawing Sheets
(5 of 5 Drawing Sheet(s) Filed in Color)

(56) References Cited

OTHER PUBLICATIONS

Rodrigues, A.E. (ed), *Ion Exchange: Science and Technology*. Martinus Nijhoff Publishers: Dordrecht, Netherlands, 1986.

Thakur, V. K.; Thakur, M. K.; Raghavan, P,; Kessler, M. R., Progress in Green Polymer Composites from Lignin for Multifunctional Applications: A Review. *ACS Sustainable Chem Eng* 2014, 2, 1072-1092.

Viet, D.; Beck-Candanedo, S.; Gray, D. G., Dispersion of cellulose nanocrystals in polar organic solvents. *Cellulose* 2007, 14, 109-113.

Xu,X.; Liu,F.; Jiang, L.; Zhu, J. Y.; Haagenson, D.; Wiesenborn, D. P., Cellulose Nanocrystals vs. Cellulose Nanofibrils: A Comparative Study on Their Microstructures and Effects as Polymer Reinforcing Agents. *ACS Appl Mater Interf* 2013, 5, 2999-3009.

Zammarano, M.; Maupin, P. H.; Sung, L.-P.; Gilman, J. W.; McCarthy, E. D.; Kim, Y. S.; Fox, D. M., Revealing the interface in polymer nanocomposites. *ACS Nano* 2011, 5, 3391-3399.

* cited by examiner

Fig. 3
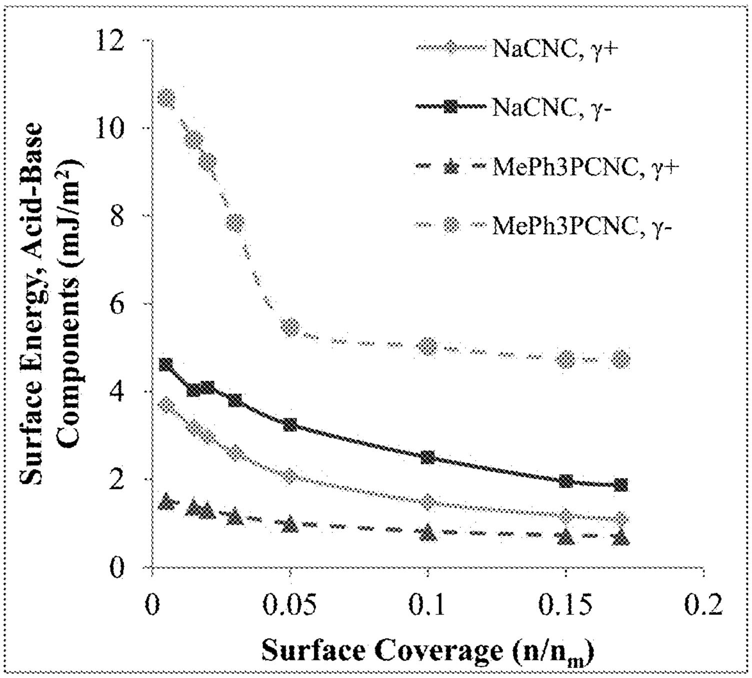
Figs. 4A-B
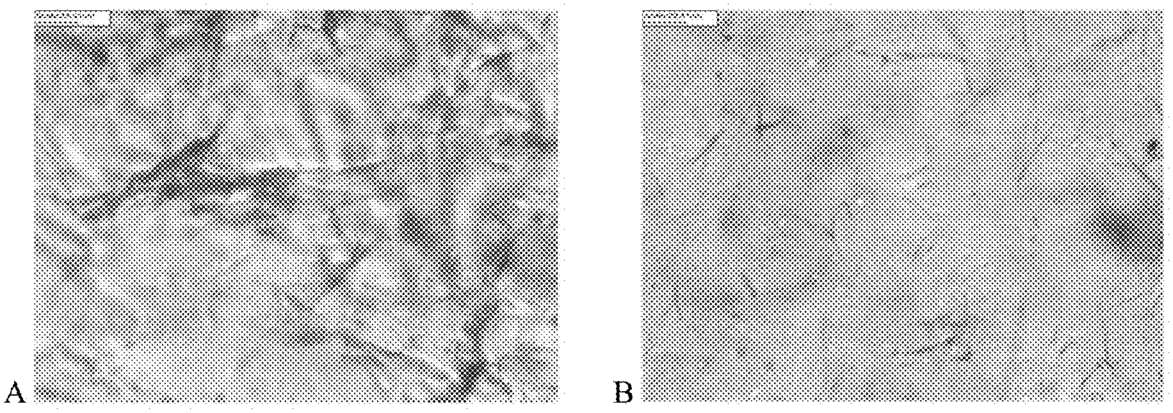
A B

Figs. 7A-D
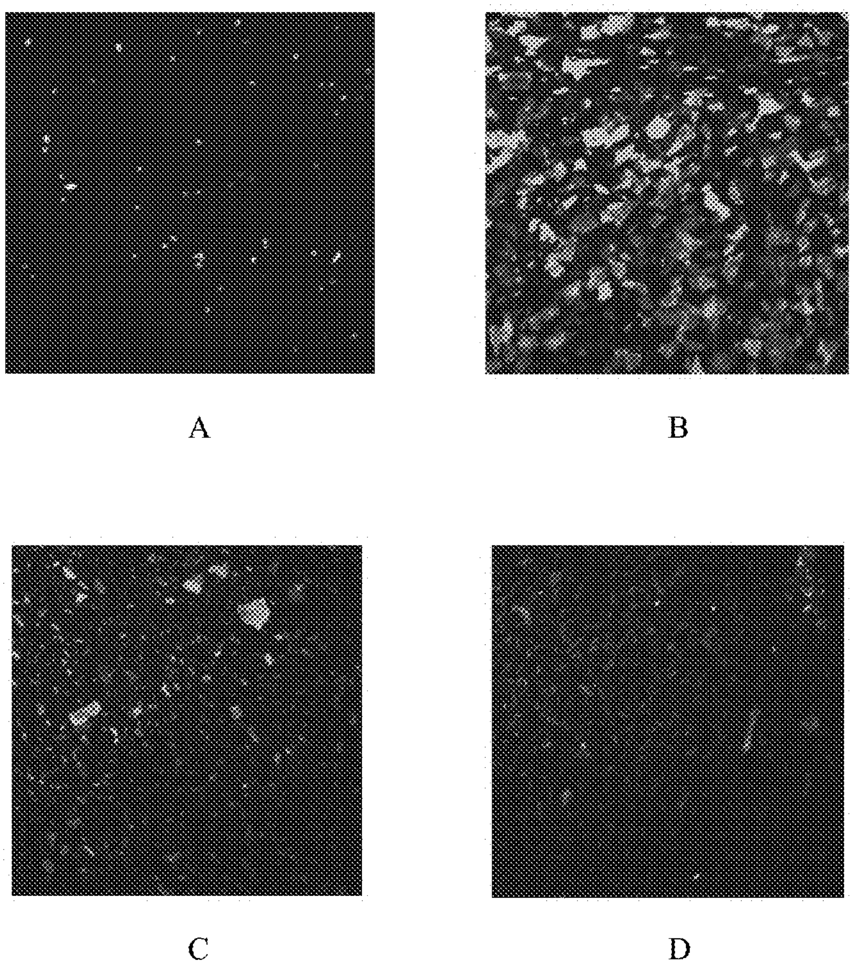
Figs. 8A-C
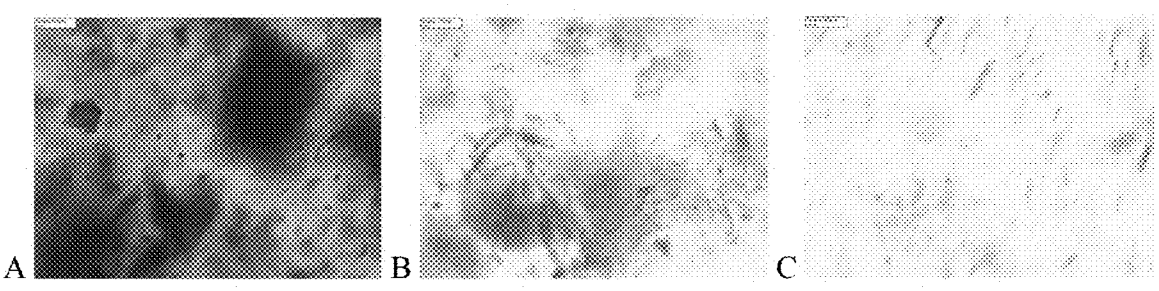

THERMALLY STABLE, DISPERSIBLE CELLULOSE NANOCRYSTALS

TECHNICAL FIELD

The present application relates to cellulose nanocrystals and other anionic carbohydrates and methods of preparation thereof. Specifically, in certain embodiments, the cellulose nanocrystals are modified using ion exchange technology to yield thermally stable or task-specific, dispersible cellulose nanocrystals.

BACKGROUND

Cellulose nanocrystals (CNCs) have been hailed as the next generation of renewable materials for polymer reinforcements. CNCs have low densities and high aspect ratios, which can increase composite strength with low weight materials. Most reinforcing materials can improve either polymer strength or polymer toughness, but improvement of one of these qualities is generally at the expense of the other. For example, lignocellulosic materials tend to improve polymer strength at the expense of toughness (1-3), whereas clay and silicates tend to increase toughness and flexural strength at the expense of tensile strength (4).

As opposed to other reinforcing materials, CNCs have been shown to simultaneously improve impact, flexural, and tensile strengths of the composite (5). This is especially advantageous for packaging materials. In addition to mechanical property enhancements, cellulose can reduce gas permeability through polymers, which is also advantageous for packaging applications. Cellulose nanocrystals are more efficient at reducing gas permeability than cellulose fibers, likely due to the creation of a tortuous path, similar to exfoliated clays (6).

There are a number of obstacles to the commercial development of CNC-reinforced polymer composites. The most critical obstacles preventing practical realization of the theoretical performance of nanocellulose/polymer composites are high levels of water absorption, low thermal stabilities, poor miscibility with non-polar polymers, and irreversible aggregation of the dried CNCs. When the CNCs are dried, their hydrophilic nature and strong hydrogen bonds make dispersion difficult in any solvent other than the very polar, aprotic ones, such as dimethylformamide or dimethylsulfoxide (7). Even for water, stable dispersion is achieved only if the dried CNCs contain at least 4 wt-% water, or if the CNCs are prepared using an oxyacid and subsequently neutralized to sodium form crystals (8). In addition, CNCs have limited thermal stabilities (9), making the industrially-preferred polymer composite preparation method of melt-blending extremely challenging. This also limits the applicability of CNC composites in the packaging industry, which relies on high-temperature melt processing techniques, such as injection molding, blow molding, and blown film extrusion. And, use of cellulose tends to increase water absorption, which can lead to increased molding and de-bonding from the polymer matrix (10) and loss in mechanical properties.

There have been a number of approaches to overcome these obstacles. Because most of the challenges stem from the presence of mobile protons and the strong hydrogen bonding between adjacent cellulose chains, most researchers tackling the problem have either used surfactants or covalently attached less polar molecules to the hydroxyl groups of the cellulose to disrupt these interactions (11). Never-dried CNCs have been successfully dispersed in water-soluble polymers, such as polyvinyl alcohol (12) or polyethylene oxide (5). These composites have then been used as surfactant—cellulose matrixes in more hydrophobic polymers (13). In addition, t-butanol and tetraalkylammonium salts have been physisorbed onto the cellulose surface as surfactants for more hydrophobic media (14). However, these approaches have had limited success due to phase separation issues and changes in composite properties because of the high content of surfactant needed—typically several times the mass of the cellulose nanocrystals themselves.

Other researchers have grafted compounds to the cellulose surface to render it more hydrophobic. The most common methods are esterification, carboxymethylation, silylation, and urethanization (11). These methods almost always require liquid—liquid extractions, heating, and purification steps, which significantly add operating costs to any scale up process. In addition, the mechanical property enhancement of the composites is often significantly lowered after the modification due to an inability to form a 3-D reinforcing network (15). For all of these methods, the thermal stabilities of the modified celluloses remain low, limiting composite preparations to in-situ polymerization and solvent casting techniques.

Ion exchange is another potential approach that is simple, commercially viable, and cost-effective. It eliminates the need for extractions, can be performed at room temperature, and often purifies the product during the exchange. In the context of CNCs, others have used a few symmetric, short-chain tetraalkylammonium hydroxides to neutralize sulfuric acid-formed CNCs (16-18). In this process, the ion exchange was achieved through an acid—base neutralization. The process is limited to the availability of organic hydroxide salts. Not only are only a handful available commercially (trimethylphenylammonium hydroxide and short chain, symmetrical alkylammonium salts such as tetrabutylammonium hydroxide), but also many are toxic. Further, this work was limited to testing dispersion in only a few solvents and forming several polymer composites using a solvent casting method in dimethylformamide. There were no observed dispersions in solvents of moderate polarity.

Thus, there is a need for improved methods to prepare thermally stable, dispersible cellulose nanocrystals and other anionic carbohydrates. In the ion exchange process described herein, any cation can be exchanged, allowing for exchange with a wide range of cation properties, including alkali and transition metals; unsymmetrical, long chain surfactants typically used in polymer composites; lipid based esterquats; and sugar based cationic surfactants.

Dispersion of cellulose nanocrystals in polymer composites is difficult to monitor. The most accepted method is the use of microscopic techniques. When nanocomposites are formed, transmission electron microscopy (TEM) or atomic force microscopy (AFM) must be used. Samples must be stained with a toxic compound, such as uranyl acetate or osmium chloride, for TEM analysis because the refractive index and density of the cellulose and polymer matrix are too similar. AFM maps surface energies, which will be similar for the cellulose and polymer when there is good dispersion and adhesion between the materials. Recently, laser scanning fluorescence microscopy was identified as a potential method for monitoring the formation of nanocomposites (19). Fluorescence labelling of cellulose is not a trivial process, and typically requires the use of a base to activate one of the hydroxyls. This can also cleave the sulfate ester, removing the charges from the cellulose nanocrystals. By adding a small quantity of a basic dye to the cation exchange mixture, a dye can be attached to the cellulose without adding additional processing steps.

The most common method of production of CNCs involves two stages. First, "raw" feedstock, such as wood, plants, bacteria, algae, etc., is pretreated to form purified cellulosic fibers. Second, the fibers are transformed into cellulose nanoparticles through mechanical treatment, acid hydrolysis, and/or enzymatic hydrolysis, through separate or combined processes.

Acid hydrolysis subjects the cellulosic fibers to strong acids, including hydrochloric, sulfuric, phosphoric, and maleic acids. After creation of the cellulose nanoparticles, a series of separation, centrifuge, ultra-sonication, filtration, washing, rinsing, and dialysis steps must be undertaken to remove the remaining acids or neutralized salts from the cellulose nanoparticles prior to use. Methods have not yet been developed to effectively implement these processes on industrial scales. Nevertheless, these methods produce cellulose nanocrystals with anionic charges and a counteraction that can be exchanged.

Ion exchange has been used commercially to purify, separate, recover, and synthesize materials (20-21). These large scale processes are used primarily in the food, beverage, and pharmaceutical industries. Additional ion-exchange applications can be found in the hydrometallurgical, electroplating, nuclear, and chloralkali industries. By far, current commercial ion exchange processes are most often used to treat process or waste water. Ion exchange processes are also used to deionize water, to soften water by exchanging polyvalent cations with univalent ones, to remove toxic ions, such as mercury or cyanide, and to remove organics, such as phenol, tannic acid, and other colorants. This application is used by the beverage industries, laundries, nuclear power generators, chemical manufacturers, and pharmaceutical companies. The use of ion exchange for separations is used predominantly in the food industry. Milk whey, high fructose corn syrup, and amino acids are prepared using commercial-scale ion chromatography columns. The different selectivities of ions toward ion exchange resins can be exploited to recover and concentrate trace materials of high economic value. This is performed predominantly in the hydrometallurgy industry for the recovery of radioactive, rare earth, and precious metals, and in the pharmaceutical industry for the recovery of antibiotics, vitamins, and proteins. Finally, ion exchange is used commercially for the synthesis of new materials. Strong cation exchange resins are frequently used as solid acid catalysts, strong anion exchange resins have been used as solid base catalysts, and enzymes have been immobilized on ion exchange resins for enzymatic reactions. Additionally, stable silica sol, fertilizers, water soluble ethylenediaminetetraacetic acid, vitamin B5, and solutions of potassium dichloroisocyanurate are regularly prepared through ion exchange processes.

Ion exchange is a cost-effective process. Although most ion-exchange processes are batch processes, use of two or three packed beds can make operation practically continuous. Unlike other surface modification methods, ion exchange is a single step process with no organic solvents, no solvent extractions, and no separations. The primary chemical cost is in the resin loading, so that operating costs increase as loading efficiencies decrease, regeneration frequencies increase, and total concentrations of exchangeable ions in the feed increase. As a general rule, ion exchange is best suited for the treatment of dilute (less than 40 mM) solutions. Due to high viscosities, CNC colloidal solutions generally are 5 wt-% or less, which would have exchangeable ion concentrations of about 10 mM, well below the typical concentration threshold.

The present methods describe the preparation of thermally stable, dispersible cellulose nanocrystals and other anionic carbohydrates using an ion exchange to result in cationic surfactant exchanged cellulose nanocrystals and other anionic carbohydrates. The results showed the ability to modify the surface energy of the cellulose, with resultant advantages. Since the number of anionic sites is limited, exchange of cations can alter surface energies without completely covering the surface of the crystals, potentially maintaining an ability to form hydrogen bonded 3-D networks in composites. The present method uses modification of cellulose nanocrystals formed during $H_2SO_4$, $H_3PO_4$, and any other oxyacid hydrolysis or during TEMPO processing, all of which produce negative charged moieties on the cellulose surface through side reactions at the C-6 hydroxyl position (22-24). These are the most prominent type of cellulose nanocrystals available. It has been found that when layered silicates are exchanged with cationic surfactants, they must be thoroughly washed to remove excess halide ions and salt impurities, which can lower thermal stabilities (25). In contrast, in one embodiment of the present method, only cations are exchanged and salt impurities are not retained by the resin, so washing by filtration, dialysis, or solvent extraction is not necessary.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 3 shows acid-base components of surface energy for Na-CNC and $MePh_3P$-CNC at 0% relative humidity using iGC.

FIGS. 4A-B show microscopic images (20×) of DGEBA/JA230 composites containing (a) 0.5% Na-CNC and (b) 0.5% $MePh_3P$-CNC.

FIGS. 7A-D show laser excitation (λ=405 nm) confocal images of (A) PS, (B) PS+1% Na-CNC, (C) PS+0.5% $(HdMe_2Im)Na_{0.9}$-CNC, and (D) PS+1% $MePh_3P$-CNC.

FIGS. 8A-C show microscopic images (20×) of polystyrene composites containing (A) 3% Na-CNC freeze dried from water, (B) 3% Na-CNC freeze dried from 9% t-BuOH (aq), and (C) 3% $MePh_3P$-CNC freeze dried from water.

DETAILED DESCRIPTION

Figure 1:
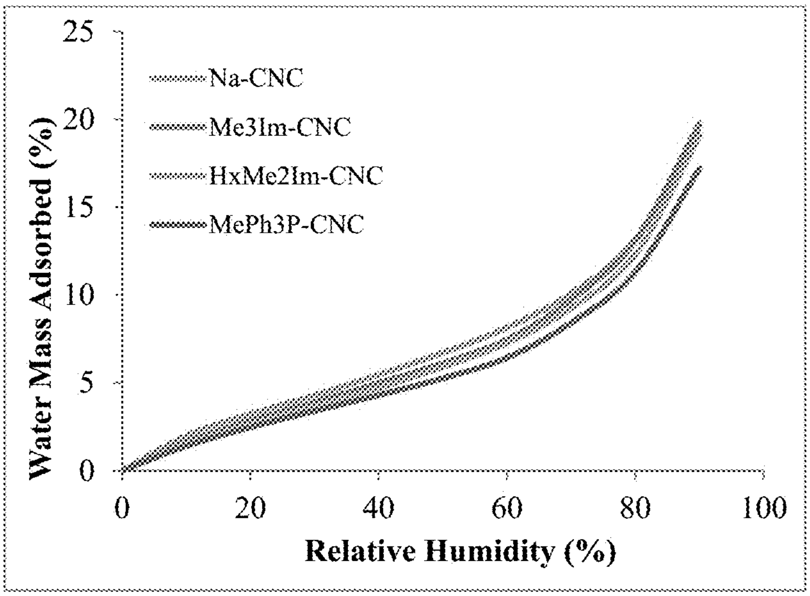
FIG. 1 shows dynamic water vapor sorption of freeze-dried, exchanged CNCs in accordance with certain embodiments of the invention.

The following detailed description will illustrate the general principles of the invention, embodiments of which are additionally provided in the accompanying examples.

The disclosed preparations and methods involve the preparation of cationic surfactant exchanged cellulose nanocrystals, including preparation using an ion exchange column. The disclosed methods involve the direct exchange of CNC cations with cationic surfactants, which simultaneously alters both the surface energy and thermal stabilities of the CNCs, and thus improves the quality of melt-blended polymer nanocomposites and other products incorporating the CNCs produced according to the disclosed methods. Results have shown an ability to modify the surface energy of the cellulose and great advantages to this technique as compared to other techniques used to alter the surface energy of the CNCs. The CNCs prepared according to the disclosed methods are suitable for dispersion even when dried.

The disclosed method can be carried out using ion exchange methodologies and apparatuses known in the art. In one embodiment, a strong acid ion exchange resin is washed in an ammonium hydroxide solution to form an ammonium ion form of the resin. The resin is then stirred in a 4-6 wt % Na-CNC solution. The solution is filtered through a screen to remove the resin, and fresh ammonium ion form resin is added to the solution. This "batch exchange" is repeated, for example four times, to produce nearly 100% $NH_4$-CNC. The process is applicable for any cationic surfactant solution to obtain surfactant exchanged CNCs.

In another embodiment, a columnar ion exchange process is used to prepare a number of modified CNCs for miscibility in polymers. CNCs are initially prepared using acid hydrolysis techniques known in the art. An ion exchange column is loaded with resin beads with a cationic surfactant for ion exchange. A solution containing the CNCs is then flowed through the column, resulting in the direct exchange of the cationic surfactant for at least some of the cationic sites on the CNCs (i.e., to replace the hydrogen ions of one or more of the acid groups of the esterified CNCs). The disclosed technique is suitable for the modification of cellulose nanocrystals formed during $H_2SO_4$, $H_3PO_4$, and any other oxyacid hydrolysis or during TEMPO processing, all of which produce negative-charged moieties on the cellulose surface through side reactions at the C-6 hydroxyl position.

Suitable cationic surfactants according to the invention include ammonium, imidazolium phosphonium, pyridinium, pyrollidinium, piperdinium, morpholinium, sulfonium, symmetrical and unsymmetrical quaternary ammonium cations, basic dye cations, silver cations, and elemental cations, covering a range of surface energies. Imidazolium and phosphonium-based surfactants have been shown to have higher thermal stabilities than ammonium based surfactants. CNCs modified with cations with longer alkyl chains generally exhibit better thermal stability than CNCs modified with small, more hydrophilic cations. However, resin selectivity complicates attachment of longer chain surfactants. In embodiments where high thermal stability is not required, any of a variety of other cationic surfactants known in the art may be used.

The exchange of cations does not need to be complete. Using partially loaded resin, flow through a column will produce CNCs that have a mixture of cations. The amount of cations transferred will depend on the selectivity of the cation towards the resin, the cellulose, and water. For instance, partially loading an acid form ion exchange resin with hexadecyl-dimethylimidazolium cations ($HdMe_2Im^+$) and flowing a solution of sodium form cellulose (Na-CNC) through a column filled with this resin produces cellulose with both protons and $HdMe_2Im^+$ cation with a higher $HdMe_2Im^+$:$H^+$ molar ratio than was originally on the resin.

A mixture of cations can be exchanged onto the CNCs. Loading the ion exchange column with a mixture of cations will produce CNCs with a mixture of cations. The ratio of ions will be dependent on the relative affinity they have for both the resin and the cellulose. For instance, loading sodium form resin with (100:1) molar ratio of methyl (triphenyl)phosphonium bromide and rhodamine 6G and flowing a solution of Na-CNC through a column filled with this resin produces fluorescent nanocrystals with a surface energy similar to that of nanocrystals completely exchanged with methyl(triphenyl)phosphonium ions.

The ion exchange process can also be used to attach cellulose nanocrystals to an immobile cationic surface. For example, the surface of glass fibers can be chemically modified with reactive groups, such as amines or epoxides. Flow of acid form cellulose nanocrystals (H-CNC) over glass fibers with an aminated surface can produce "fuzzy" glass fibers decorated with cellulose nanocrystals. The hydrophobicity or surface energy of these fibers can be altered by using mixed cation cellulose nanocrystals, such as $HdMe_2Im^-$/$H^+$-CNC produced using partially loaded resins. The process can be extended to other aminated surfaces, such as chitosan; aminated gold; aminated carbon; aminated aramid; or lysine-, histidine-, and arginine-rich polypeptides using methods known in the art.

The flow of cellulose solutions through the ion exchange column also purifies the CNCs, producing a product that is whiter (a more desirable) and that has a higher cation exchange capacity as compared to the state of the art CNC production methods. The higher cation exchange capacity may be due to the removal of non-ionic cellulose or non-ionic impurities. For CNCs in the disclosed process, only cations are exchanged, and salt impurities are not retained by the resin, so washing by filtration, dialysis, or solvent extraction will not be necessary.

Since the number of anionic sites on the CNCs is limited, the exchange of cations according to the disclosed method can alter surface energies without completely covering the surface of the crystals with surfactant. Accordingly, in some embodiments, the inventive CNCs maintain an ability to form hydrogen bonded 3-D networks in composites.

CNCs according to the present disclosure may have the following structure:

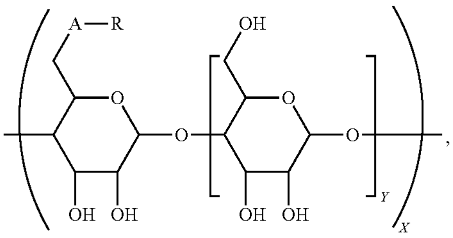, where each A is independently selected from $O_2^-$ or an esterified oxyacid anion, where each R is independently selected from $H^+$, $Na^+$, $Im^+$, $HdMe_2Im^+$, $MePh_3P^+$, $Me_3PhP^+$, $Me_3Im^+$, $NH_4^+$ or other exchangeable cation, with the proviso that at least one A-R is not A-H or A-Na, and where Y is typically in the range of 10-30 monomer units. In one embodiment, $A{=}SO_4^{2-}$. In other embodiments, $A{=}PO_4^{3-}$, $A{=}PO_3^{3-}$, or $A{=}O_2^{-}$.

The ion exchange process may be used to prepare fully or partially exchanged CNCs that have high thermal stabilities and a broad range of surface energies, as required for a specific melt-blended polymer composition or other products. We have found that surfactant cation exchanged CNCs have the ability to improve the organo-clay thermal stability enough to enable exfoliated clay in melt-blended polyethylene terephthalate and polystyrene, de-bundle and disperse multi-walled carbon nanotubes in melt-blended polystyrene nanocomposites, and improve the thermal stability of fluorinated synthetic mica by 100° C. The disclosed process produces similar improvements for CNCs. The modified CNCs may be melt-blended with several polymers commonly used in packaging applications, for example with polystyrene (PS), poly(acrylonitrile-co-butadiene-co-styrene) (ABS), high density polyethylene (LDPE), and polylactic acid (PLA).

Supportive Data

Using the disclosed technique, a wide variety of modified CNCs were produced. $Ag^+$ exchanged CNCs were prepared and dispersed in polyvinyl alcohol. ICP analysis confirmed the cations were exchanged. The x-ray diffraction patterns of Ag-CNC and a 4% Ag-CNC in PVOH had no discernable peaks associated with Ag(0), indicating well dispersed single ions and the absence of silver nanoparticles.

Phosphonium and imidazolium surfactants were exchanged and used in a variety of polymer composites. The exchange efficiencies can be deduced from the analysis of cations after exchange. Concentrations can be measured using ion selective electrodes (e.g. $Na^+$ or $H^+$), UV spectroscopy (e.g. $HdMe_2Im^+$ or $MePh_3P^+$), fluorescence spectroscopy (e.g. rhodamine 6G), or ICP (e.g. Na, S, C, P, Ag). As shown in Table 1, below, the more hydrophobic cations do not fully exchange the sites on cellulose.

TABLE 1

Exchange efficiency of cellulose nanocrystals

| CNC | $[Na^+]$ mM | $[H^+]$ mM | [IL] mM | meqv/L | g CNC/100 g | meqv/g |
|---|---|---|---|---|---|---|
| Na-CNC | 5.5 | 0.0 | 0.0 | 5.5 | 2.51 | 0.219 |
| H-CNC | 0.2 | 4.4 | 0.0 | 4.6 | 1.88 | 0.245 |
| $Me_3$Im-CNC | 0.6 | 0.0 | 3.7 | 4.3 | 1.85 | 0.232 |
| (post EtOH) | 2.0 | 0.0 | 3.2 | 5.2 | 2.18 | 0.239 |
| $HxMe_2$Im-CNC | 4.3 | 0.0 | 2.1 | 6.4 | 2.66 | 0.241 |
| $HdMe_2$Im-CNC | 0.0 | 1.4 | 3.2 | 4.6 | Not tested | |
| ($Na^+$ column) | 4.4 | 0.0 | 0.5 | 4.9 | Not tested | |
| $Me_3$Ph-CNC | 0.5 | 0.0 | 4.6 | 5.1 | 2.30 | 0.222 |

This is at least in part due to the inability to fully exchange the cation resin. Since the solubility of the hexadecylimidazolium salt is largely driven by the solubility of the anion ($Cl^-$ salt is readily soluble, but $BF_4^-$ and $PF_6^-$ salts are practically insoluble in water), the inability to solvate the polyanionic resin leads to a very low exchange of the cation. The exchange on the cellulose is significantly higher than the loading on the resin, indicating a higher affinity for cellulose over the solid resin. The drop in exchange efficiency after an ethanol wash is because the resin had to be re-suspended to rehydrate the beads and remove all air bubbles. As a result, the column no longer contained any regions where there was only ionic liquid cation. This indicates that the cellulose selectivity of hydrophobic cations is less than or equal to $Na^+$ cations. The concentration of cellulose decreases after flow through the column, which indicates that there is some affinity between the cellulose and the resin. However, the average number of exchange sites after flow through the column increases, which might indicate the removal of low exchange site impurities, such as residual lignin.

Figure 2:
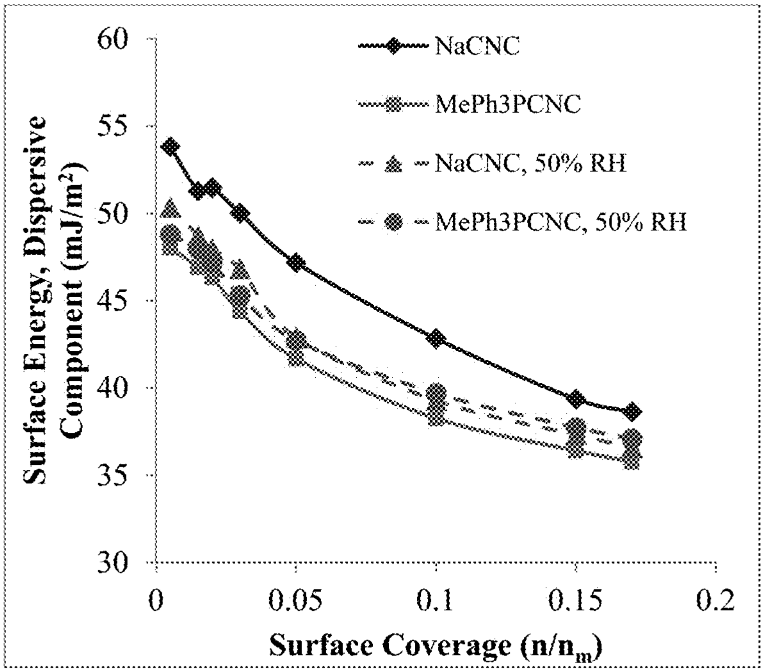
FIG. 2 shows dispersive component of surface energy for Na-CNC and $MePh_3P$-CNC at 0% relative humidity using iGC.

Despite the relatively low number of exchange sites (1 out of every 20 glucose units), the exchanged CNCs were significantly less hygroscopic and had lower surface energies than the Na-CNCs. The water sorption profiles for several exchanged CNCs are shown in FIG. 1. As expected, the more hydrophobic cations resulted in lower levels of water adsorbed. In this series of exchanges, $MePh_3$P-CNC adsorbed 30% less water at 70% relative humidity. The hysteresis (additional water retention) upon desorption was also lower for the CNCs exchanged with the more hydrophobic cations. Exchanged CNCs also had lower surface energies. Using inverse gas chromatography, it was observed that both the dispersive component and the acid base character of the surface energy are lowered. The comparative surface energies of Na-CNC and $MePh_3$P-CNC are shown in FIG. 2 and FIG. 3. As expected, the surface energies at 50% relative humidity are also lowered, as there is less water adsorbed to the cellulose surface.

Bisphenol A based epoxies are hydrophobic with aromatic character. In addition to lower surface energies, $MePh_3$P-CNCs have aromatic character, which improves the adhesion in these epoxies. Na-CNC and $MePh_3$P-CNC were shear mixed with bisphenol A diglycyl ether (DGEBA) and cured with a standard polyethylene glycol diamine. As shown in FIG. 4, the exchanged CNCs exhibited much better dispersion and formed smaller aggregates than the Na-CNCs. This level of dispersion is typically achieved with cellulose only when using a surfactant or chemical grafting technique.

Figure 5:
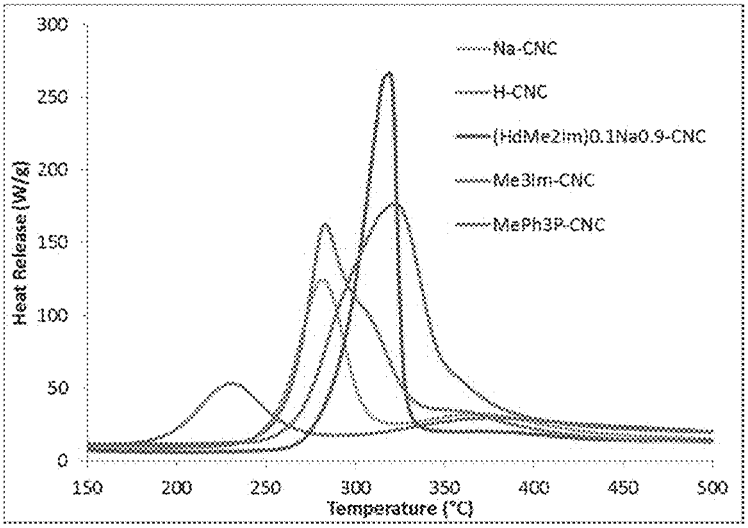
FIG. 5 shows heat release rate measured by microcombustion calorimeter analysis of exchanged CNCs according to one embodiment.
Figure 6:
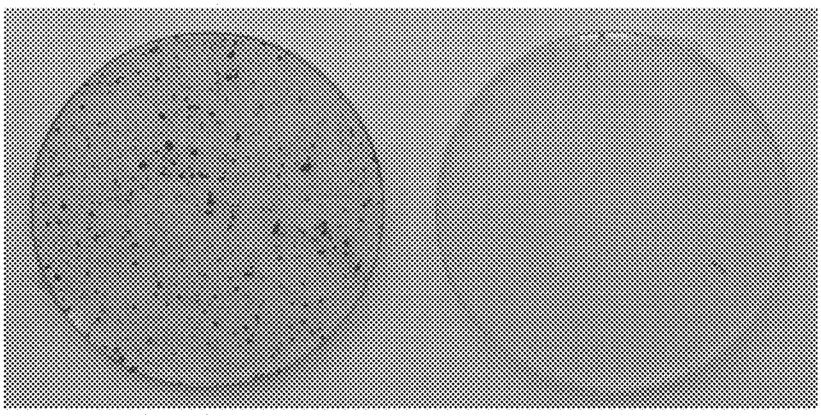
FIG. 6 shows dispersion of exchanged CNCs according to one embodiment; left side–PS+0.5% Na-CNC, mixed 195° C., 200 rpm, 3 min, Pressed 160° C., 5 min; right side–PS+0.5% $MePh_3P$-CNC, mixed 195° C., 200 rpm, 3 min, Pressed 160° C., 5 min.
Figure 9:
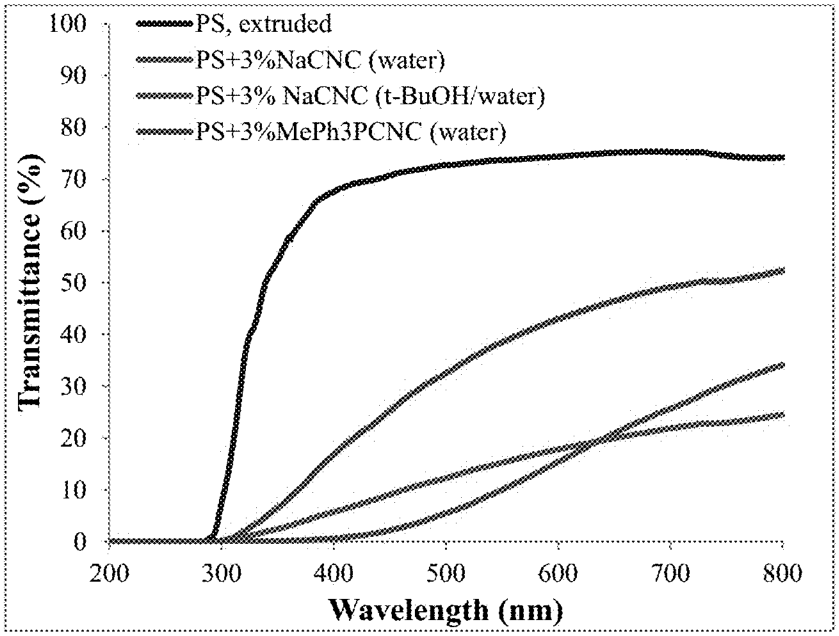
FIG. 9 shows transmission spectra of 3% CNC—PS composites, showing dispersion and reduction in aggregation of exchanged CNCs according to one embodiment.

Replacing the sodium ion or proton in sulfated CNCs with imidazolium and quaternary phosphonium cations not only alters the surface energies, but also increases the thermal stability of the crystals. As a result, CNC polymer nanocomposites can be prepared for a large range of polymers using a melt-blending technique. We found that 1-hexadecyl-2,3-dimethylimidazolium cation ($HdMe_2Im^+$) and methyl(triphenyl)phosphosphonium cation ($MePh_3P^+$) exchanged CNCs have thermal stabilities 50° C. greater than the initial CNCs used (i.e., Na-CNC and H-CNC), as shown by the microcombustion calorimeter analysis in FIG. 5. As shown in FIG. 6, $MePh_3P^+$ exchanged CNCs show superb dispersion and no degradation as compared to Na-CNCs, which form large, partially degraded aggregates when melt blended with polystyrene. Both polystyrene and the cellulose nanocrystals show some fluorescence. The exchange did not appear to significantly reduce the fluorescence of the CNCs, though intensities and quantum yields have not been determined. The fluorescence allowed for dispersion characterization by laser scanning confocal fluorescence microscopy (LSCFM). The images provided in FIG. 7 show that the ionic liquid cation exchange leads to much smaller particle sizes and good dispersion throughout the matrix. The smallest particle sizes were obtained using $MePh_3$P-CNC, leading to transparent composites at both 0.5% and 1.0% loadings. Freeze dried Na-CNCs have recently become commercially available. These crystals are typically freeze dried with a small amount of t-butanol (t-BuOH). This reduces the ice crystal size and improves redispersibility into polar solvents, such as water and DMF. In addition, it adds a small amount of t-BuOH to the crystal structure, which can aid in dispersion in more hydrophobic media, such as polymers. As observed in FIG. 8*a* and FIG. 8*b*, CNC agglomerates are indeed reduced, from about 100 μm diameter particles to about 50 μm diameter particles. In addition, there are more rod like structures. Using the disclosed process, separation and dispersion is further improved (cf FIG. 8c), reducing the largest aggregates to about 10 μm×20 μm. Almost all the particles are now rod-like, and the average aspect ratio is much closer to that of the original CNCs. The smaller sized aggregates result in higher transmission through the polymer, as shown in FIG. 9.

CNCs modified with arylphosphonium and alkylimidazolium cations are more thermally stable than CNCs modified with alkylammonium cations. As shown in FIG. 5 and Table 2, the use of long alkyl chain surfactants does indeed improve the thermal stability of the cellulose nanocrystals. Use of smaller, more hydrophilic cations do not show the same thermal stability improvement. The microcombustion calorimetry data also shows that the long alkyl chains add some fuel to the material, increasing the total heat released. The flammability of these nanocrystals are still lower than pure cellulose crystals, likely due to the presence of sulfate groups, which have been shown to increase char formation and reduce both the peak heat release rate (HRC) and the total amount of material consumed (THR).

TABLE 2

Microcombustion calorimetry data for exchanged cellulose nanocrystals

| CNC | THR (kJ/g) | HRC (J/gK) | $T_{peak}$ (° C.) | % Char |
|---|---|---|---|---|
| H-CNC | 4.5 | 60 | 230 | 24 |
| $NH_4$-CNC | 4.6 | 121 | 246 | 21 |
| $HdMe_2Im$/H-CNC | 5.8 | 100 | 260 | 21 |
| Na-CNC (as received) | 6.5 | 131 | 281 | 22 |
| Na-CNC (exchanged) | 9.7 | 276 | 316 | 12 |
| $Me_3Im$-CNC | 10.0 | 171 | 304 | 12 |
| $Me_3Im$/Na-CNC | 8.0 | 178 | 284 | 14 |
| $HxMe_2Im$-CNC | 12.0 | 203 | 331 | 9 |
| $HdMe_2Im$/Na-CNC | 7.8 | 277 | 315 | 15 |
| $Me_3PhP$-CNC | 12.6 | 195 | 341 | 12 |

A column containing cation exchange resin was loaded with $MePh_3PBr$. NaCNC was exchanged and the effluent was collected in a sequence of consecutive equal volumes. As the ions are exchanged, a concentration gradient develops through the column. The initial vial has the highest percent of ions exchanged and each subsequent vial has a lower extent of exchange. As noted in Table 3, series of CNCs with variable levels of $MePh_3P^+$ were thus obtained.

TABLE 3

Cation analysis of $MePh_3P$-CNC, prepared sequentially.

| | | | |
|---|---|---|---|
| $MePh_3P$ 0-8 mL | 2.24 | 4.89 | 7.1 |
| $MePh_3P$ 9-16 mL | 1.50 | 4.77 | 6.3 |
| $MePh_3P$ 17-24 mL | 1.71 | 4.50 | 6.2 |
| $MePh_3P$ 25-32 mL | 2.05 | 3.92 | 6.0 |
| $MePh_3P$ 33-40 mL | 2.35 | 3.67 | 6.0 |
| $MePh_3P$ 43-50 mL | 2.75 | 3.21 | 6.0 |
| $MePh_3P$ 51-58 mL | 3.06 | 3.16 | 6.2 |
| $MePh_3P$ 59-66 mL | 3.22 | 2.89 | 6.1 |
| $MePh_3P$ 67-74 mL | 3.55 | 2.57 | 6.1 |
| $MePh_3P$ 75-82 mL | 3.51 | 2.73 | 6.2 |

Figure 10:
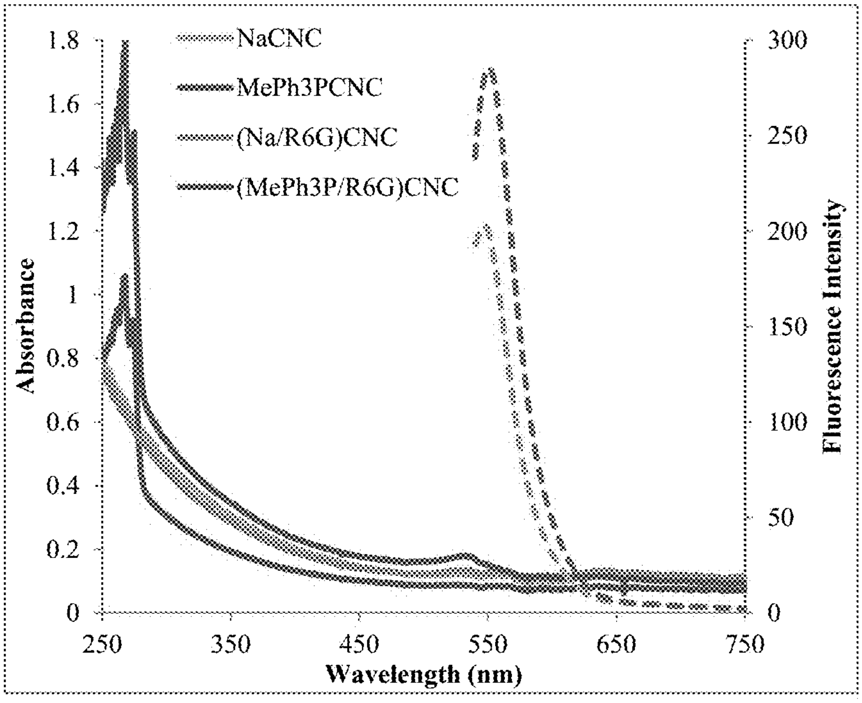
FIG. 10 shows absorbance and fluorescence (λ=520 nm) of Na-CNC and $MePh_3P$-CNC exchanged with cation mixture containing 1/100 Rhodamine 6G.

Cation exchange resins were loaded with (100:1) NaCl: Rhodamine 6G and (100:1) $MePh_3PBr$:Rhodamine 6G and packed in separate columns. Na-CNC was fed through the columns to produce fluorescent CNCs with overall surface energies close to Na-CNC and $MePh_3P$-CNC, respectively. The exchange was confirmed using ICP analysis to determine the $Na^+$ and S content and fluorescence spectra to determine the rhodamine 6G. The absorbance and fluorescence spectra for the exchanged CNCs are shown in FIG. 10.

The methods and advantages discussed here can be applied to other celluloses that contain multiple negative charges. Uncharged cellulose nanofibers (CNF) were reacted with $NaIO_4$ to form dialdehyde cellulose nanofibers (DACNF). The DACNF were then reacted with $NaClO_2$ to form dicarboxylic acid cellulose nanofibers (DCCNF). The DCCNF were filtered and rinsed with $MePh_3PBr$, followed by ultra-pure water. The resulting nanofibers, now containing ionically bound $MePh_3P^+$ were solvent exchanged into N,N-dimethylformamide and blended with PS to form solvent-cast composites. Similar anionic celluloses can be formed using TEMPO, dicarboxylic acids, or chlorosulfonic acid. The technology described can be applied to these celluloses as well.

The methods and advantages described here can also be applied to other carbohydrates that contain multiple negative charges. Applicable polysaccharides include pectin (carboxylic groups), alginic acid (carboxylic groups), carrageenans (sulfate groups), glucosaminoglycans (such as chondroitin sulfate, heparin sulfate, or hyaluronic acid), and cellulose phosphate (phosphate groups). The cations in Na-alginate and i-carrageenan were exchanged with $MePh_3P^+$ and (100:1) $MePh_3P^+$:Rhodamine 6G. Although the thermal stabilities of these carbohydrates were not enhanced as much as the exchanged CNCs, their surface energies were modified, allowing for the preparation of well dispersed epoxy composites. The technology can also be applied to anionic mono- and di- saccharides, such as phytic acid, sugar phosphates, uronic acids, aldonic acids, and aldaric acids or nucleotides, such as ADP or ATP.

The embodiments of this invention shown in the drawings and described above are exemplary of numerous embodiments that may be made within the scope of the appended claims.

References, each of which is incorporated by references in its entirety:

1. Bledzki, A. K.; Reihmane, Gassan, S. J., Thermoplastics Reinforced with Wood Fillers: A Literature Review. *Polym—Plastics Technol Eng* 1998, 37, 451-468.
2. Peng, B. L.; Dhar, N.; Liu, H. L.; Tam, K. C., Chemistry and Applications of Nanocrystalline Cellulose and its Derivitives: A Nanotechnology Perspective. *Canadian Journal of Chemical Engineering* 2011, 89, 1191-1206.
3. Thakur, V. K.; Thakur, M. K.; Raghavan, P; Kessler, M. R., Progress in Green Polymer Composites from Lignin for Multifunctional Applications: A Review. *ACS Sustainable Chem Eng* 2014, 2, 1072-1092.
4. Gao, F., Clay/polymer composites: the story. *Materials Today* 2004 11, 50-55.
5. Xu,X.; Liu, F.; Jiang, L.; Zhu, J. Y.; Haagenson, D.; Wiesenborn, D. P., Cellulose Nanocrystals vs. Cellulose Nanofibrils: A Comparative Study on Their Microstructures and Effects as Polymer Reinforcing Agents. *ACS Appl Mater Interf* 2013, 5, 2999-3009.
6. Dufresne, A., *Nanocellulose: From Nature to High Performance Tailored Materials*, Walter de Gruyter: Berlin, 2012.
7. Viet, D.; Beck-Candanedo, S.; Gray, D. G., Dispersion of cellulose nanocrystals in polar organic solvents. *Cellulose* 2007, 14, 109-113.
8. Beck, S.; Bouchard, J.; Berry, R., Dispersibility in water of dried nanocrystalline cellulose. *Biomacromolecules* 2012, 13, 1486-1494.

9. Huang, J.; Chang, P. R.; Lin, N.; Dufresne, A., eds., *Polysaccharide Based Nanocrystals: Chemistry and Applications*, Wiley-VCH, 2015.

10. Espert, A.; Vilaplana, F.; Karlsson S., Comparison of water absorption in natural cellulosic fibres from wood and one-year crops in polypropylene composites and its influence on their mechanical properties. *Composites A* 2004, 35, 1267-1276.

11. Miao, C. W.; Hamad, W. Y., Cellulose reinforced polymer composites and nanocomposites: a critical review. *Cellulose* 2013, 20, 2221-2262.

12. Li, W.; Yue, J.; Liu, S., Preparation of nanocrystalline cellulose via ultrasound and its reinforcement capability for poly(vinyl alcohol) composites. *Ultrasonics Sonochemistry* 2012, 19, 479-485.

13. Azouz, K. B.; Ramires, E. C.; Van den Fonteyne, W.; El Kissi, N.; Dufresne, A., Simple Method for the Melt Extrusion of a Cellulose Nanocrystal Reinforced Hydrophobic Polymer. *ACS Macro Letters* 2012, 1, 236-240.

14. Hubbe, M. A.; Rojas, O. J.; Lucia, L. A.; Sain, M., Cellulose Nanocomposites: A Review. *BioResources* 2008, 3, 929-980.

15. Mariano, M.; El Kissi, N.; Dufresne, A., Cellulose nanocrystals and related nanocomposites: Review of some properties and challenges. *J Polym Sci. B. Polym Phys* 2014, 52, 791-806.

16. Cheung, C. C. Y.; Giese, M.; Kelly, J. A.; Hamad, W. Y.; MacLachlan, M. J., Iridescent Chiral Nematic Cellulose Nanocrystal/Polymer Composites Assembled in Organic Solvents. *ACS Macro Letters* 2013, 2, 1016-1020.

17. Beck, S.; Bouchard, J.; Berry, R., Method to control the dispersibility and barrier properties of dried nanocrystalline cellulose in solutions of different pH and ionic strength. U.S. Ser. No. 12/654,084

18. Beck, S.; Bouchard, J.; Berry, R., Dried nanocrystalline cellulose of controllable dispersibility and method therefor. U.S. Ser. No. 13/008,126

19. Zammarano, M.; Maupin, P. H.; Sung, L. P.; Gilman, J. W.; McCarthy, E. D.; Kim, Y. S.; Fox, D. M., Revealing the interface in polymer nanocomposites. *ACS Nano* 2011, 5, 3391-3399.

20. Rodrigues, A. E. (ed), *Ion Exchange: Science and Technology*. Martinus Nijhoff Publishers: Dordrecht, Netherlands, 1986.

21. Inamuddin, Dr.; Luqman, M. (eds.), *Ion Exchange Technology II: Applications*. Springer: Dordrecht, Netherlands, 2012.

22. Araki, J.; Wada, M.; Kuga, S.; Okano, T., Influence of surface charge on viscosity behavior of cellulose microcrystal suspension. *J Wood Sci* 1999, 45, 258-261.

23. Montanan, S.; Roumani, M.; Heux, L.; Vignon, M. R., Topochemistry of Carboxylated Cellulose Nanocrystals Resulting from TEMPO-Mediated Oxidation. *Macromolecules* 2005, 38, 1665-1671.

24. Espinosa, S. C.; Kuhnt, T.; Foster, E. J.; Weder, C., Isolation of Thermally Stable Cellulose Nanocrystals by Phosphoric Acid Hydrolysis. *Biomacromolecules* 2013, 14, 1223-1230.

25. Davis, R. D.; Gilman, J. W.; Sutto, T. W.; Callahan, J. H.; Trulove, P. C.; De Long, H., Improved thermal stability of organically modified layered silicates. *Clays and Clay Minerals* 2004, 52, 171-179.

What is claimed is:

1. A method for producing a dispersible cellulose nanocrystal comprising:

providing an ion exchange column comprising a resin;

pre-loading the resin of the ion exchange column with a desired cation; and flowing a solution of cellulose nanocrystals through the ion exchange column, to result in at least a portion of the cellulose nanocrystal's cations to be exchanged with the desired cation from the resin, wherein the desired cation comprises imidazolium, phosphonium, pyridinium, pyrollidinium, piperdinium, morpholinium, sulfonium, symmetrical and unsymmetrical quaternary ammonium, basic dye cations, silver cations, amino acids, or protonated amines.

2. The method of claim 1, wherein only a portion of the cellulose nanocrystal's cations are exchanged with the desired cation.

3. The method of claim 1, wherein the resin contains a mixture of two or more of the desired cations.

* * * * *